(12) United States Patent
Blandina et al.

(10) Patent No.: US 12,441,327 B2
(45) Date of Patent: Oct. 14, 2025

(54) METHOD FOR DETERMINING INTERFACE CONDITIONS BETWEEN TIRE AND GROUND, PARTICULARLY TO DETERMINE THE ONSET OF AQUAPLANING PHENOMENA

(71) Applicant: Easy Rain I.S.p.A., Milan (IT)

(72) Inventors: Giovanni Blandina, Milan (IT); Mauro Pierallini, Milan (IT); Stefano Caserini, Milan (IT); Davide Fassio, Milan (IT)

(73) Assignee: Easy Rain I.S.p.A., Milan (IT)

( * ) Notice: Subject to any disclaimer, the term of this patent is extended or adjusted under 35 U.S.C. 154(b) by 108 days.

(21) Appl. No.: 18/574,853

(22) PCT Filed: Jun. 27, 2022

(86) PCT No.: PCT/IB2022/055947
§ 371 (c)(1),
(2) Date: Dec. 28, 2023

(87) PCT Pub. No.: WO2023/275711
PCT Pub. Date: Jan. 5, 2023

(65) Prior Publication Data
US 2024/0294172 A1   Sep. 5, 2024

(30) Foreign Application Priority Data
Jul. 2, 2021   (IT) .................. 102021000017588

(51) Int. Cl.
*B60W 40/064*   (2012.01)
*B60W 40/107*   (2012.01)
*B60W 50/14*   (2020.01)

(52) U.S. Cl.
CPC ........ *B60W 40/064* (2013.01); *B60W 40/107* (2013.01); *B60W 50/14* (2013.01); *B60W 2520/105* (2013.01); *B60W 2520/26* (2013.01)

(58) Field of Classification Search
CPC ............. B60W 40/064; B60W 40/107; B60W 40/1005; B60W 40/101; B60W 50/14;
(Continued)

(56) References Cited

U.S. PATENT DOCUMENTS

| | | | | |
|---|---|---|---|---|
| 5,493,893 A | * | 2/1996 | Kin .................. | B60T 8/172 73/9 |
| 5,765,119 A | * | 6/1998 | Otabe .................. | B60T 8/172 701/80 |

(Continued)

FOREIGN PATENT DOCUMENTS

| | | |
|---|---|---|
| DE | 102017001064 A1 | 8/2018 |
| DE | 102018113334 A1 | 12/2019 |

(Continued)

OTHER PUBLICATIONS

Masago (Year: 2019).*
Search Report and Written Opinion dated Nov. 3, 2022. 11 pages.

*Primary Examiner* — George C Jin
(74) *Attorney, Agent, or Firm* — RMCK Law Group PLC

(57) ABSTRACT

A method is described for determining interface conditions between a tire and the ground in a motor vehicle, particularly to determine an onset of an aquaplaning phenomena. The method includes: determining a reference longitudinal acceleration of the vehicle, measuring an actual longitudinal acceleration of the vehicle, calculating a difference between the reference longitudinal acceleration and the actual longitudinal acceleration, determining an additional drag at the interface between tire and ground on the basis of the difference, and a lift at the interface between tire and ground on the basis of the additional drag, and determining a
(Continued)

threshold force at which a lifting of the tire from the ground occurs, comparing the lift with the threshold force and determining a degree of proximity of the interface conditions between tire and ground to an aquaplaning condition.

10 Claims, 15 Drawing Sheets

(58) Field of Classification Search
CPC ....... B60W 2520/105; B60W 2520/26; B60W 2510/0695; B60W 2510/0638; B60W 2510/0697; B60T 8/172
See application file for complete search history.

(56) References Cited

U.S. PATENT DOCUMENTS

| | | | |
|---|---|---|---|
| 2003/0101805 A1 | 6/2003 | Raab | |
| 2003/0120403 A1* | 6/2003 | Damaske | G01P 21/00 701/30.6 |
| 2004/0064219 A1* | 4/2004 | Mancosu | B60R 16/0237 73/146 |
| 2004/0117100 A1* | 6/2004 | Kin | B60T 8/173 701/70 |
| 2009/0243830 A1* | 10/2009 | Heise | B60C 23/0411 340/447 |
| 2009/0299570 A1* | 12/2009 | Kammann | B60C 23/0459 701/36 |
| 2017/0320494 A1* | 11/2017 | Singh | B60W 30/04 |
| 2024/0190366 A1* | 6/2024 | Decoster | B60T 8/1725 |
| 2025/0162571 A1* | 5/2025 | Rocca | B60W 10/06 |

FOREIGN PATENT DOCUMENTS

| | | | | |
|---|---|---|---|---|
| EP | 0793207 | A2 | 9/1997 | |
| JP | 2019020302 | A * | 2/2019 | ......... B60W 40/064 |

\* cited by examiner

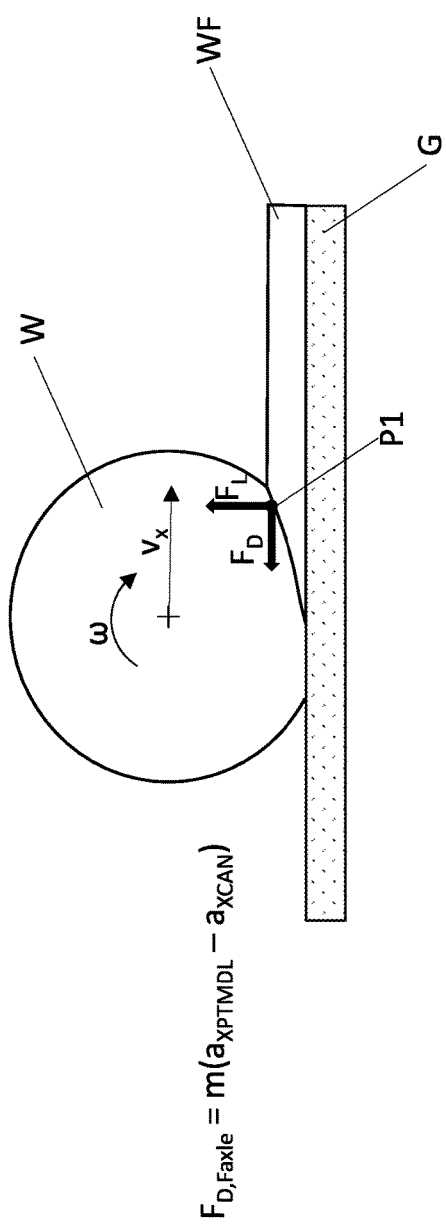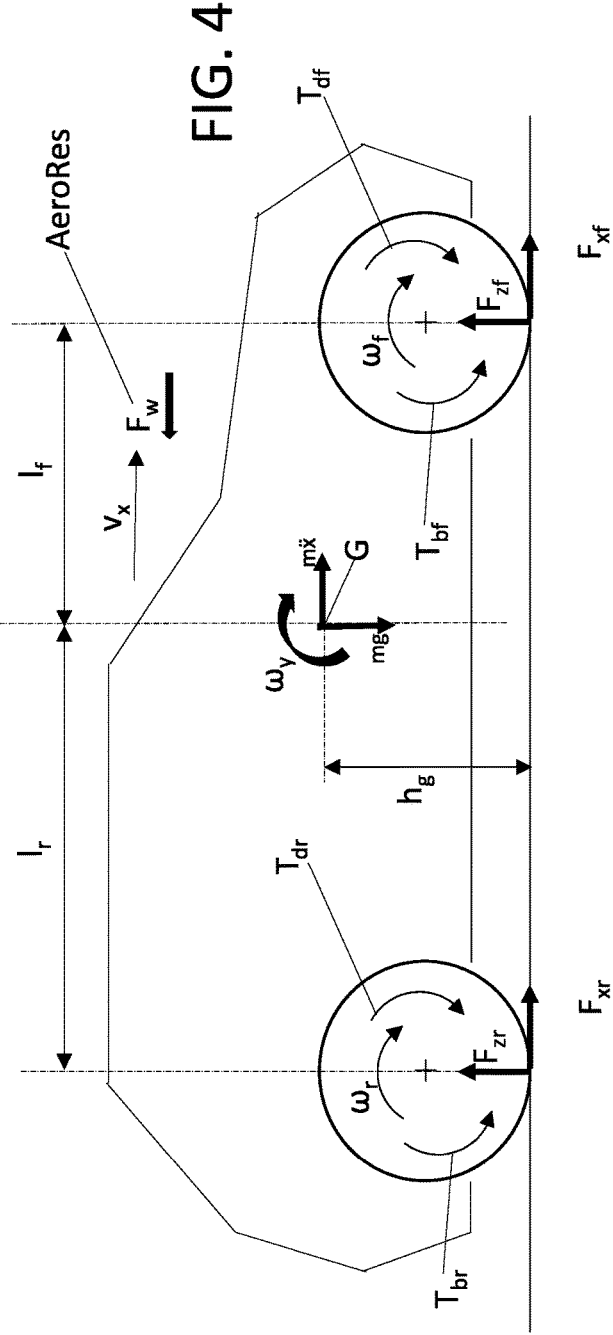

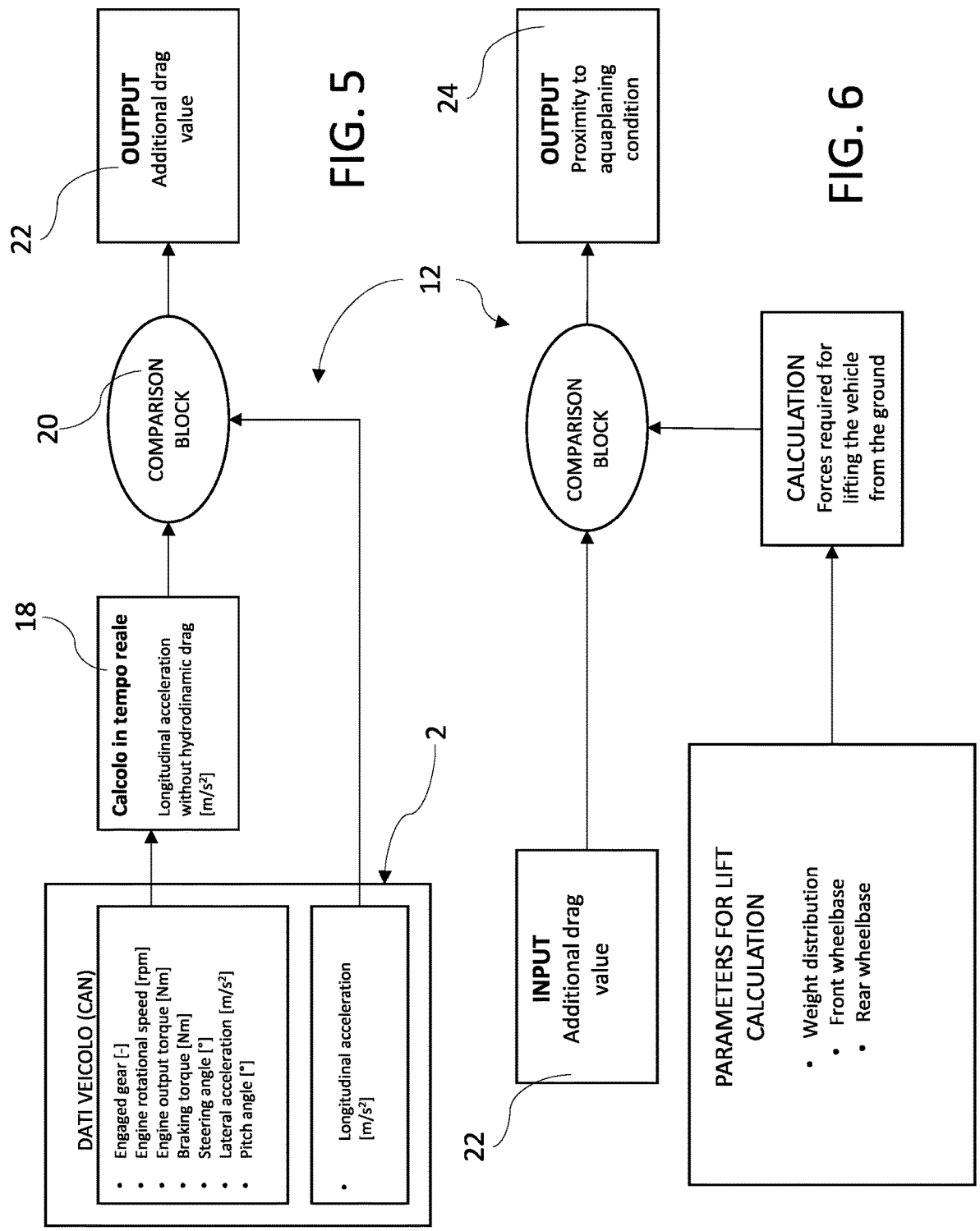

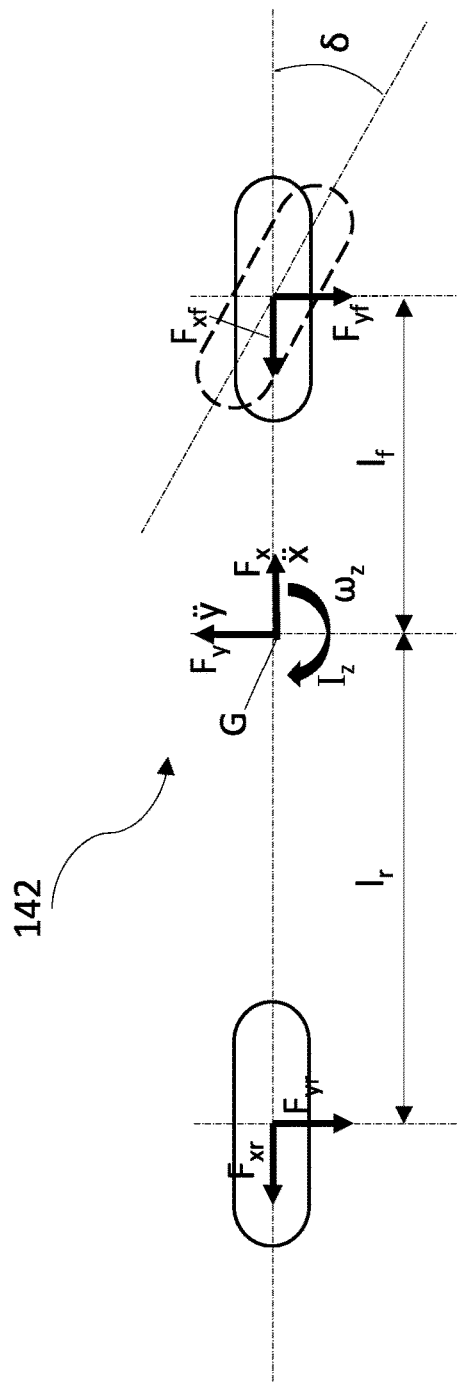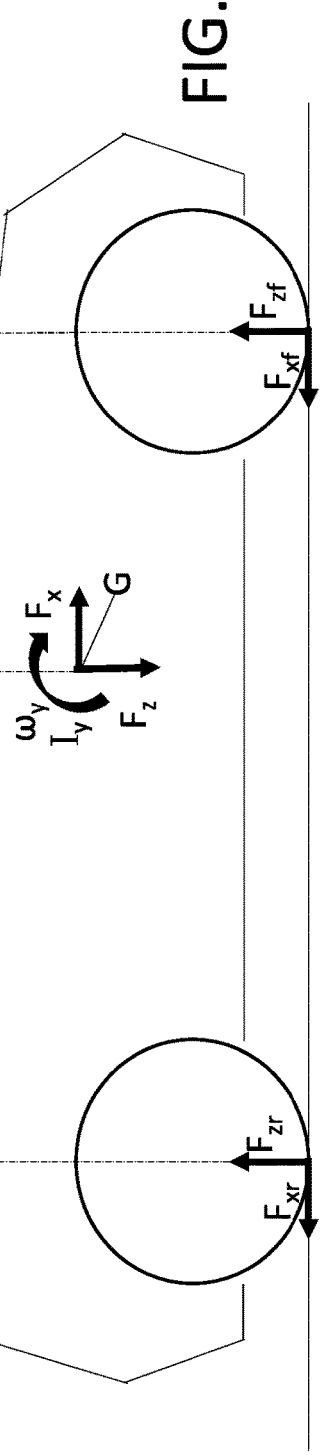

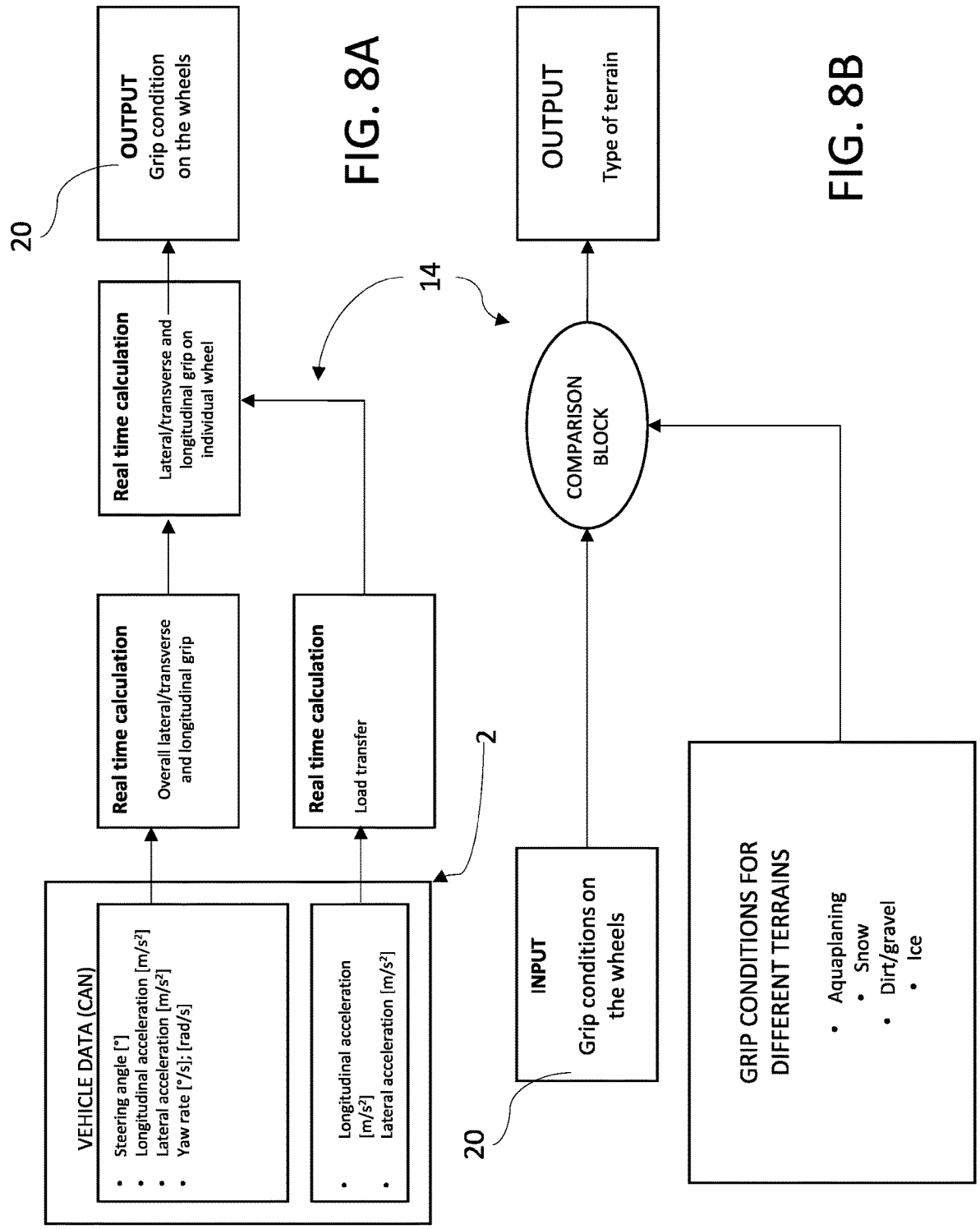

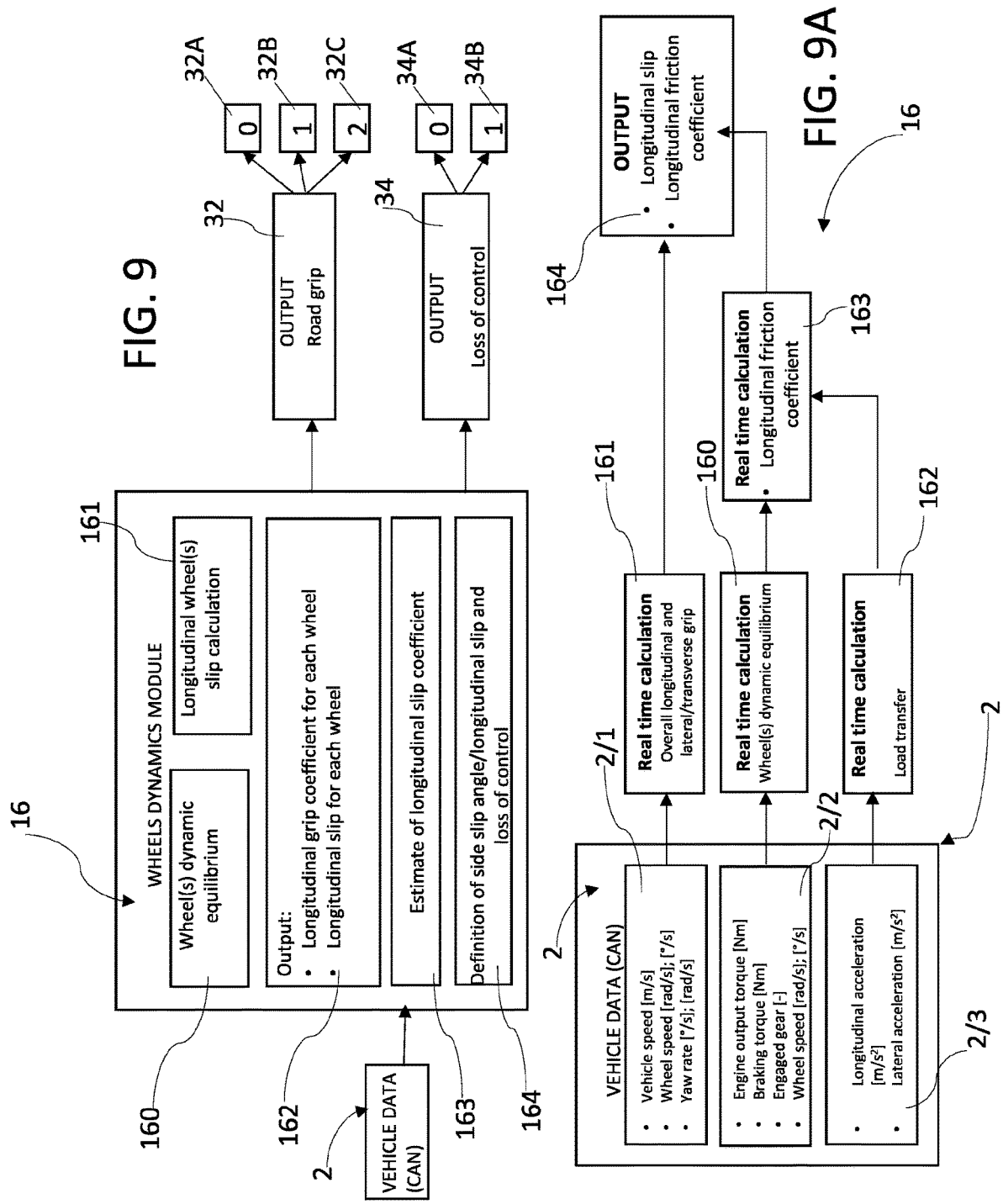

METHOD FOR DETERMINING INTERFACE CONDITIONS BETWEEN TIRE AND GROUND, PARTICULARLY TO DETERMINE THE ONSET OF AQUAPLANING PHENOMENA

CROSS-REFERENCE TO RELATED APPLICATIONS

This application is a 371 National Stage of International Application No. PCT/IB2022/055947, filed Jun. 27, 2022, which claims priority to Italian Patent Application No. 102021000017588 filed Jul. 2, 2021. The disclosure of each of the above applications is incorporated herein by reference in its entirety.

FIELD OF THE INVENTION

The present invention refers to diagnostics methods and systems for a motor vehicle. Specifically, the invention has been developed with reference to the diagnostics of the interface conditions between tire and ground while the motor vehicle is running.

PRIOR ART

A plurality of methods and systems are known for determining the interface conditions between tire and ground in a motor vehicle, most of them being dependent on the operation of the control systems for vehicle drive and/or stability, or on autonomous or semi-autonomous driving systems.

The complex of information deriving from the implementation of such methods and such systems is however little effective in determining and contrasting certain phenomena, such as aquaplaning, which derive from particular interface conditions between the tire and the ground. In other words, in the present situation no item of information which may be useful to determine or contrast such and event can be derived by means of the known methods.

This shortcoming may impair the effectiveness even of the most advanced anti-aquaplaning systems (in this regard, the Applicant is holder of a plurality of National Patent Applications, such as, e.g., 102021000011108, 102021000011111, 102021000011117 or 102014902296915), since it is impossible to control the anti-aquaplaning system in such a way as to obtain a specific, and ultimately more effective, intervention on the aquaplaning conditions that the vehicle must deal with, nor is it possible to prepare the anti-aquaplaning system for an intervention when the conditions that the vehicle is encountering indicate a strong probability of incurring in an aquaplaning event.

On the other hand, the known methods and systems do not enable the diagnostics of the interface conditions between tire and ground, with the purpose of controlling an anti-aquaplaning system, without resorting to further sensors or equipment which are not normally present on a vehicle, and which are hardly implementable for cost reasons.

OBJECT OF THE INVENTION

The object of the present invention is to solve the technical problems mentioned in the foregoing. Specifically, the object of the invention is to provide a method for determining the interface conditions between tire and ground which enables, i.a., to manage the operation of an anti-aquaplaning system without the need to resort to further sensors or equipment in addition to those which are commonly present onboard motor vehicles.

SUMMARY OF THE INVENTION

The object of the invention is achieved by a method having the features set forth in the claims that follow, which form an integral part of the technical disclosure provided herein with reference to the invention.

BRIEF DESCRIPTION OF THE FIGURES

The invention will now be described with reference to the annexed Figures, which are provided purely by way of non-limiting example, and wherein:

FIGS. 2 to 6 show block diagrams concerning the preferred implementation of first elements of the method according to the invention, FIGS. 7 and 8 show block diagrams concerning the preferred implementation of second elements of the method according to the invention.

DETAILED DESCRIPTION

Figure 1:
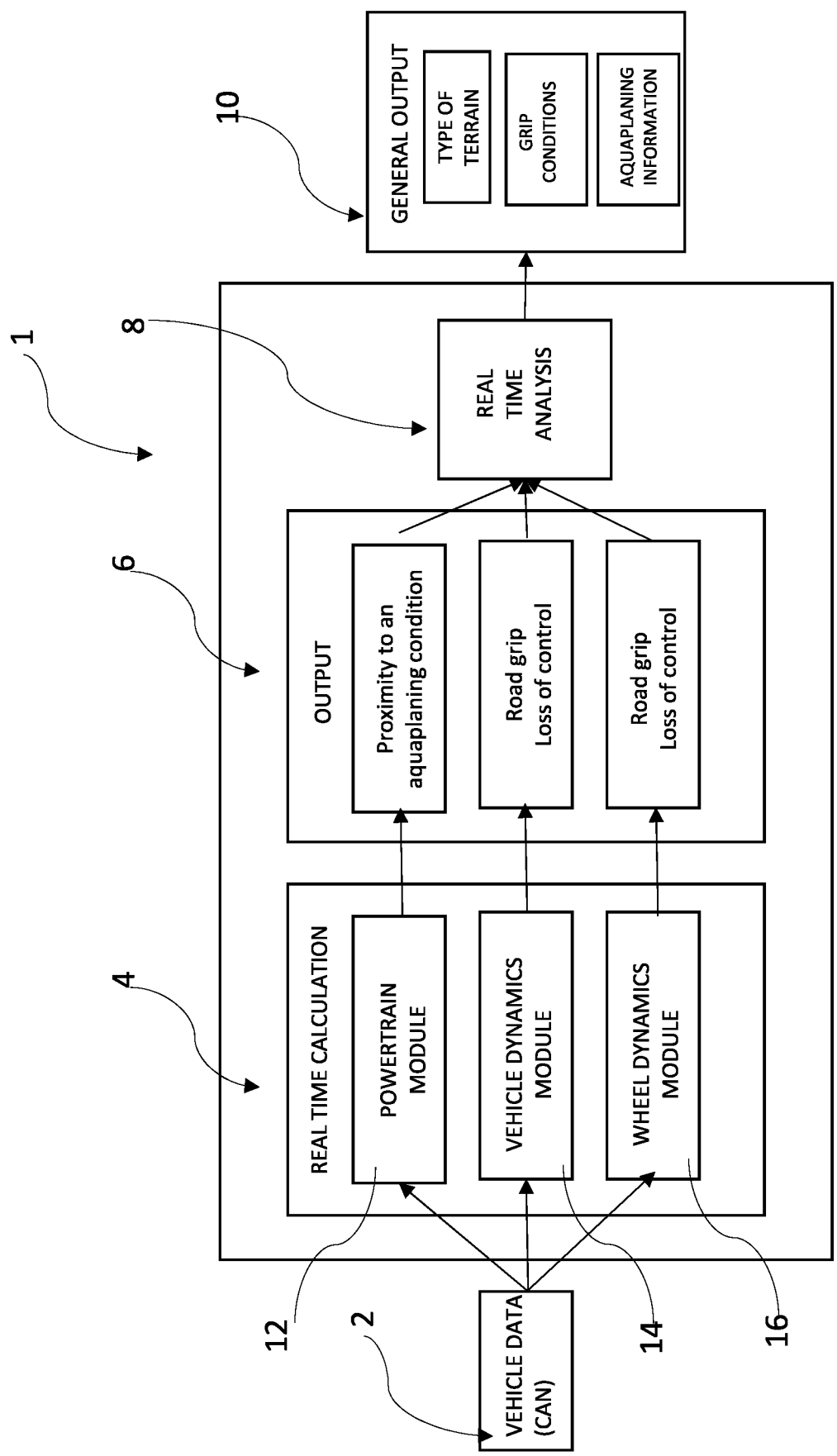
FIG. 1 shows a block diagram of a method according to the invention.

Reference number 1 in FIG. 1 designates as a whole a block diagram of a method for determining the interface conditions between tire and ground in a motor vehicle, specifically to determine the onset of aquaplaning phenomena, according to embodiments of the invention.

With reference to the functional diagram as a whole—the different embodiments being adapted to have one or more of the functional blocks shown in FIG. 1—the method according to the invention is based on a complex of input data 2, a real-time calculation stage 4, an intermediate complex of output data 6, a (real-time) analysis stage 8, and a final complex of output data 10.

The functional definition within each stage or complex mentioned in the foregoing may vary according to the processing needs (or resources) and/or according to the control needs which require the real-time implementation of the calculation method.

In the embodiments which must meet the strictest processing and/or control requirements, the general structure is as shown in FIG. 1, wherein the real-time calculation stage 4 includes a first calculation module 12, configured to operate on the basis of data from a vehicle power train assembly, a second calculation module 14, configured to operate on the basis of general dynamics data of the vehicle, and a third calculation module 16, configured to operate on the basis of dynamics data of the single wheels of the vehicle. According to the invention, the calculation modules 14 and 16 are optional, i.e., they may be provided in order to determine further information levels and further output data for the method according to the invention, while module 12 is generally provided in all the embodiments, because—even in the absence of the further levels of information from modules 14 and 16—it enables determining a degree of proximity of the interface conditions between tire and ground to an aquaplaning phenomenon.

Figure 2:
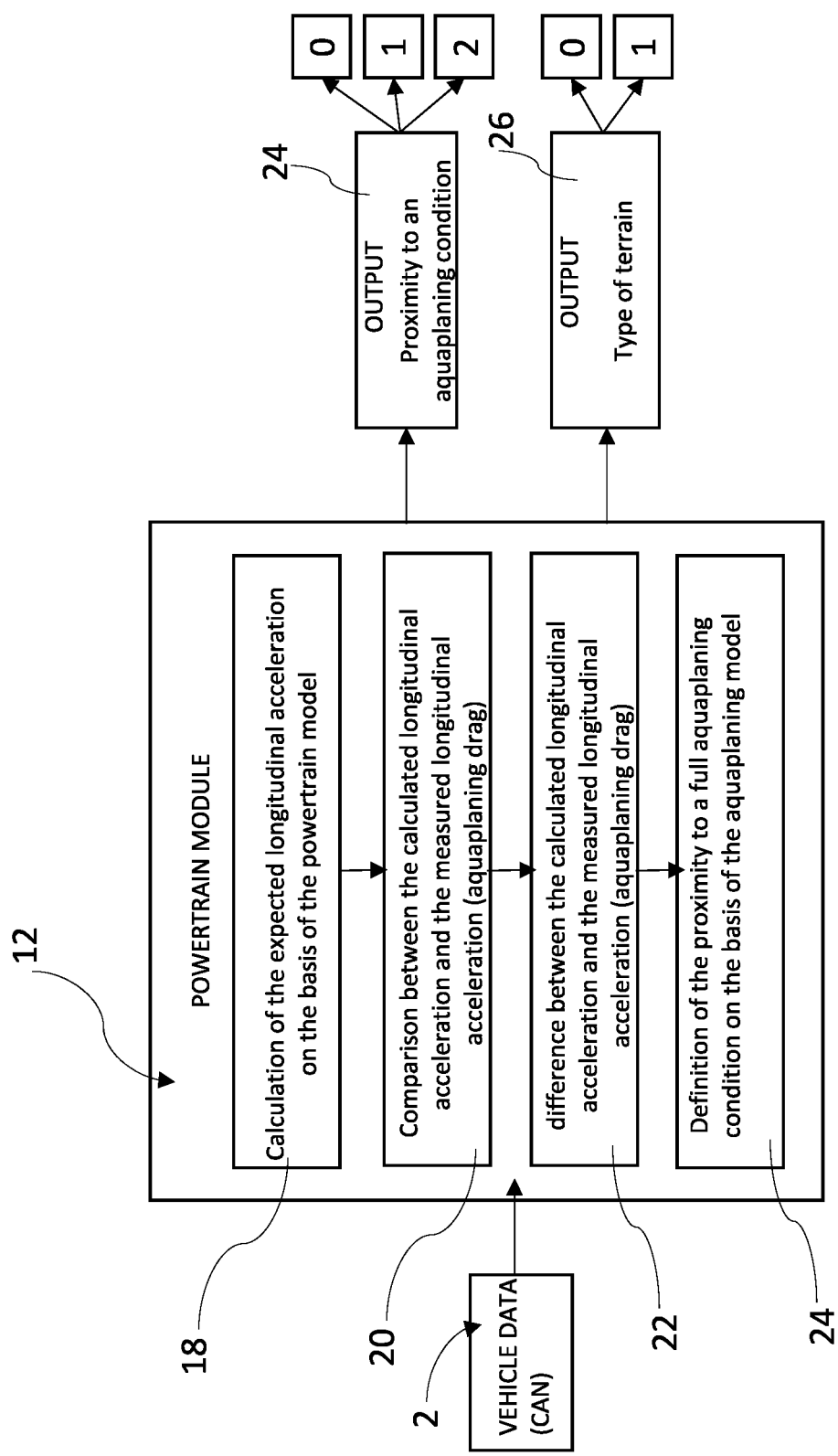

FIG. 2 shows a block diagram of calculation module 12, which is defined in the following, for brevity, as "power train module". In the method according to the invention, the power train module 12 allows establishing a degree of proximity to an aquaplaning condition by means of an estimate of the lift acting on each wheel of the vehicle and by means of a comparison of said lift with a threshold force value which would cause the lifting of the vehicle from the ground, i.e., the separation of the contact between tire and ground.

The functional blocks denoted by 18, 20, 22, 24 in FIG. 2 schematically show method steps which implement the determination mentioned in the foregoing.

Specifically, according to the invention, the power train module is configured to process the complex of input data 2 (comprising the data and the parameters which are normally available on the CAN network, without the need of additional sensors or equipment with respect to those which are normally present on board the vehicle), and specifically the sub-complex concerning the power train assembly, in such a way as to:

determine a reference longitudinal acceleration $a_{XPTMDL}$ of the vehicle (FIGS. 3 and 4)—block 18 measure an actual longitudinal acceleration of the vehicle $a_{XCAN}$, calculate a difference between the reference longitudinal acceleration $a_{XPTMDL}$ and the actual longitudinal acceleration $a_{XCAN}$, determine an additional drag value (which in aquaplaning is of a hydrodynamic nature) at the interface between tire and ground on the basis of said difference, and determine a lift at the interface between tire and ground on the basis of said additional drag, determine a threshold force at which a lifting of the tire from the ground occurs, compare said lift with said threshold force and determine a degree of proximity of the interface conditions between tire and ground to an aquaplaning condition— block 24.

Each of the above-mentioned steps will now be described in detail with reference to FIGS. 3 to 6.

FIG. 3 shows a diagram of a wheel W of a vehicle facing a water film WF on ground G, which is taken as a theoretical reference for the method according to the invention. At a point P1 on the tread surface of wheel W a resultant of the hydrodynamic forces is exerted which comprises a hydrodynamic drag component $F_D$ and a lift component $F_L$, which depends on the value of the hydrodynamic drag component $F_D$.

Assuming that all the hydrodynamic drag components act onto one single axis (i.e., the front axle of the vehicle), the overall drag component acting on the front axle may be expressed as $$F_{D,Faxle} = m(a_{XPTMDL} - a_{XCAN})$$

i.e., it is a function of the difference between the reference longitudinal acceleration $a_{XPTMDL}$ and the actual longitudinal acceleration $a_{XCAN}$.

With reference to FIG. 4, the overall equation of the longitudinal dynamic balance of the vehicle may be written as $$m\ddot{x} = \sum F_{x\_ij} - AeroRes - HydroRes - Fslope$$

wherein:

$\ddot{x}$ is the vehicle longitudinal acceleration, $\Sigma F_{x\_i,j}$ is the sum of the longitudinal forces acting on the right/left wheel (i) of the front/rear axle (j), AeroRes is the resultant of the aerodynamic drag forces acting on the vehicle, HydroRes is the resultant of the hydrodynamic drag forces (due to the interaction of the tire with the water film WF), Fslope is the resultant of the drag or driving forces deriving from the ground inclination (upward or downward slope). Due to the sign convention adopted, Fslope is positive when dragging, and it is negative when driving.

Given these assumptions, the unknown component HydroRes may be determined as a difference from the reference case, wherein no water film is present at the interface between tire and ground, substantially by subtracting the following two equations:

$$ma_{XPTMDL} = \Sigma F_{x\_i,j} - AeroRes - Fslope \text{ (reference case)}$$

$$ma_{XCAN} = \Sigma F_{x\_i,j} - AeroRes - HydroRes - Fslope \text{ (actual situation in the presence of water film WF)}$$

whence:

$$m(a_{XPTMDL} - a_{XCAN}) = HydroRes = F_{D,Faxle}$$

Therefore, referring to FIG. 5, from the vehicle CAN network a plurality of operating and dynamic parameters are known, including:

gear engaged engine rotating speed [rpm]

torque delivered by the engine [Nm]

braking torque [Nm]

steering angle [°]

lateral acceleration [m/s2]

pitch angle [°].

It may be observed that such data may be obtained from any data network of the vehicle, and not necessarily from the CAN network. For this reason, each time the present specification refers to the use of data present on the CAN network, it must be understood that the data may derive either from the CAN network or from any other data network of the vehicle.

Therefore, by making data it is possible to calculate, in real time, the value of the reference longitudinal acceleration of the vehicle $a_{XPTMDL}$ (block 18) and to compare it to the acceleration $a_{XCAN}$ (block 20) which is a further item of data available on the CAN network (or any data network of the vehicle), in order to determine the hydrodynamic drag value $F_{D,Faxle}$ (HydroRes) caused by the water film WF (block 22).

Subsequently (FIG. 6), by making use of the value $F_{D,Faxle}$ it is possible to determine the lift component $F_L$, in order to compare it to a threshold force (lift) value which is necessary to lift the tire from the ground and which largely depends on static values of the vehicle, such as the distribution of weight between the axles and from the front and rear wheelbase (distance from the centre of mass). The relationship between the values $F_{D,Faxle}$ and $F_L$ is determined during the calibration of the method and of the related calculation models.

A few computational remarks.

In the calculation of the reference longitudinal acceleration, some simplifying assumptions are preferably made, because various parameters involved in the equation of dynamic balance which may be written with reference to the diagram in FIG. 4 may vary during the drive. For example the vehicle mass, as well as the rolling resistance of the single tires, may vary during the drive. Generally, one should cyclically update the values of the parameters which influence the longitudinal dynamic balance of the vehicle, but the method according to the invention enables solving this computational problem by determining a plurality (preferably three, see blocks 24A, 24B, 24C) of levels or degrees of proximity to an aquaplaning condition. With such a division it is no longer necessary, for example, to know the exact position of the centre of mass of the vehicle in time, nor the vehicle mass, so that a minimally corrected reference value of the longitudinal acceleration is more than sufficient. If a continuous monitoring is desired of the degree of aquaplaning phenomenon, i.e. a proximity to an condition including virtually infinite levels or degrees of proximity to an aquaplaning phenomenon, it will be obviously necessary to update—on the basis of the available data (and, to this end, the vehicle itself provides updating by means of the electronic control units on board)—the vehicle parameters which vary during the drive, so as to incorporate such variations into the calculation of the reference longitudinal acceleration.

For example, the vehicle mass may be updated in real time and/or at every start on the basis of the acceleration calculations during low-speed manoeuvring. For example, at vehicle start it is possible to make use of the first manoeuvres, which are nearly certainly low-speed manoeuvres (exiting a garage or a parking lot) in order to detect the vehicle accelerations and estimate the mass at the vehicle re-start, because the mass may be different from the last data known, e.g. because of the presence of a higher number of passengers on board and/or of a higher amount of fuel or luggage.

As regards the calculation of the threshold force value at which a tire lifts off the ground, the computational burden may generally be lower, because in very many conditions the variability of the vehicle mass may not significantly impact on the calculation of the threshold force value, and the weight distribution between the axles may therefore be deemed reasonably constant (or at least sufficiently constant for the calculation requirements), in the same way as the values of the front and the rear wheelbase (all these values fundamentally depend on the position of the centre of mass). Of course, a finer and more dynamic mapping of the position of the centre of mass of the vehicle, and of the evolution of the vehicle mass itself, lead to more accurate estimates, which may be resorted to according to needs, especially when circumstances demand it.

To sum up, the list in the following reports the complexes of input data and output data which characterize a preferred embodiment of the power train module 12.

Direct Input Data
  Speed of the wheels (front left, front right, rear left, rear right wheels) [rpm] or [rad/s]
  Vehicle speed of advancement [m/s]
  Gear engaged [−]
  Engine speed [rpm] or [rad/s]
  Drive torque [Nm]
  Steering angle [°]
  Braking torque [Nm]
Indirect Input Data
  Transverse resultant of the tire/ground interface forces $F_y$ [N]—from module 14, if present, or else estimated from CAN data
Required Parameters
  tire rolling radius [m]—for each wheel;
  transmission ratio T_ratio between engine and wheels (in front wheel drive or rear wheel drive vehicles) or transmission ratio between engine and wheels mediated by the torque distribution ratio between front and rear axle (in four-wheel drive vehicles)
  mass moment of inertia of the engine [kg·m$^2$]
  mass moment of inertia of the wheel [kg·m$^2$]—for each wheel
  vehicle mass [kg]
  longitudinal aerodynamic drag coefficient $C_x$ [−]
  area of the vehicle front section [m$^2$]
Output Data
  degree of proximity to an aquaplaning condition [−] (block 24)
  indication of the ground type (block 26)

Figure 7:
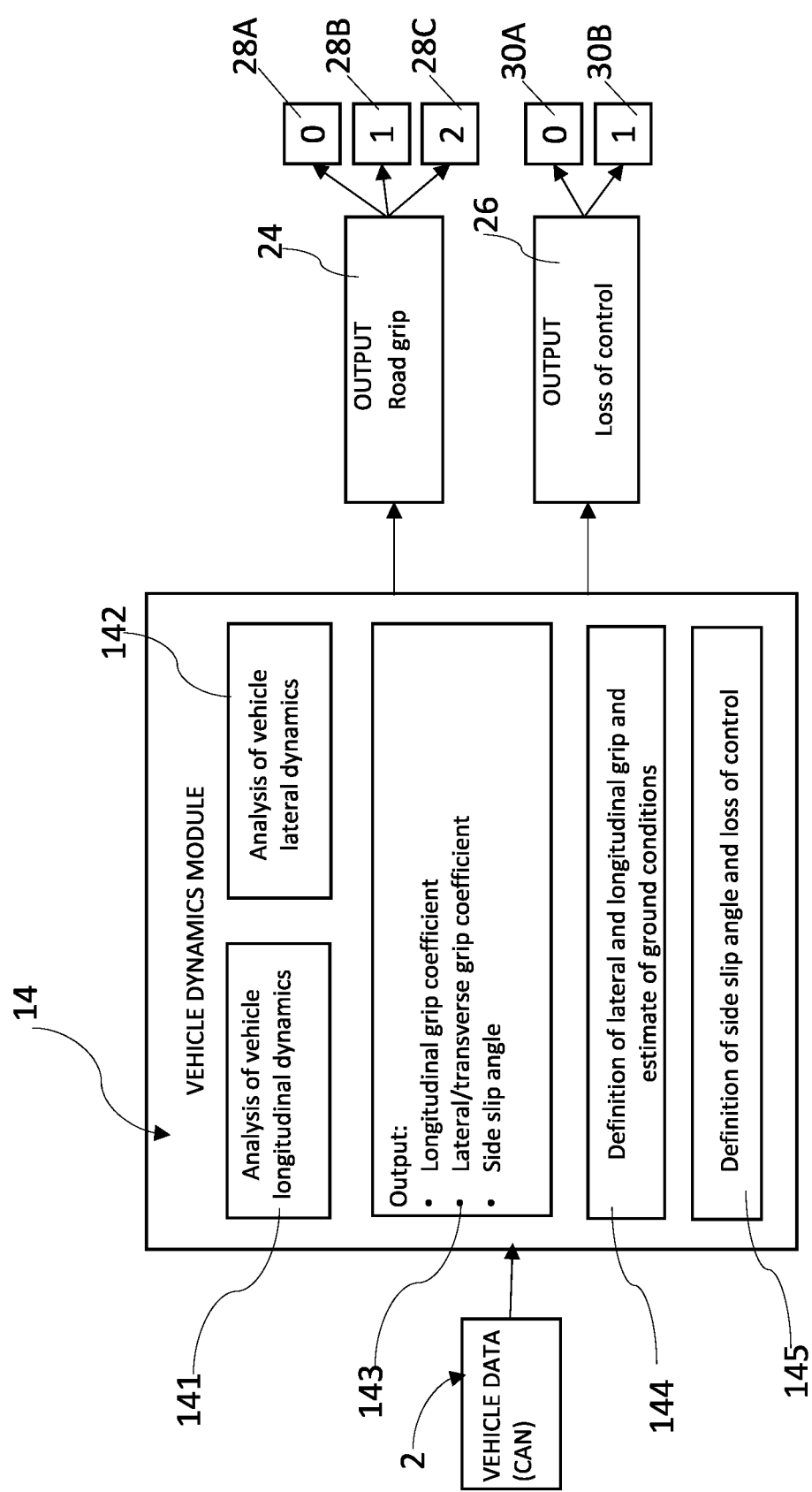

Referring to FIGS. 7, 8 and 9, there will be described the block diagrams and the operating logic of calculation modules 14 and 16, which respectively correspond to a dynamics module of the vehicle (14) and to a longitudinal dynamics module of the wheels (16). These calculation modules implement, in parallel with module 12, a mapping of the driving conditions of the vehicle which may be reliable in every condition. In other words, each calculation module 12, 14, 16 has a reliability interval which does not cover the whole range of driving conditions of the vehicle, but covers a subset thereof. The reliability intervals of domains 12, 14, 16 have overlapping areas which may be used as a means for the consistency control of the determinations implemented by each module, and non-overlapping areas wherein the module providing more reliable results may be taken as a reference for the vehicle control. The reliability intervals are the influenced by the quality of the sensors on vehicles. The more advanced the sensors on the vehicle (e.g. for vehicles), autonomous the wider the reliability interval. In this regard, in the embodiments comprising only module 12 or lacking an integration of module 12 with modules 14, 16 in the fashion described in the foregoing, the control of the vehicle and of the anti-aquaplaning system on board is carried out, optionally with more precautions in the intervention logics, in order to mitigate the effects at the borders of the reliability interval, only on the basis of the calculation results of module 12.

Referring to FIGS. 7 and 8, the dynamics module 14 of the vehicle again employs, as an input data complex, the complex of information on the CAN network (or on another data network of the vehicle), in the same way as module 12.

Module 14 executes five main operations, i.e.:
  acquiring data from the CAN network (or from another data network of the vehicle),
  processing the longitudinal dynamics (block 141) and the transverse dynamics (block 142) of the vehicle,
  analysing the evolution of the grip forces on the basis of the vehicle dynamics (block 143),
  analysing the overall condition of contact with the ground (block 144),
  defining the ground condition on the basis of instantaneous grip values and of the evolution thereof in time (block 145).

Module 14 is configured to process the data on the CAN network (or on another data network of the vehicle, for example from a inertial platform of the vehicle), in such a way as to obtain an estimate of:
  Transverse grip (block 28)
  Longitudinal grip (block 28)
  Drift (block 30)

This is useful for evaluating the general grip conditions of the vehicle, and for some initial evaluations on the distribution, onto the four tires, of the forces exchanged at the interface with the ground. It must be remarked that this is an evaluation independent from the variables considered in the power train module 12, and therefore, as mentioned in the foregoing, module 14 may offer a different perspective and a different mapping of the dynamic state of the vehicle.

The following list summarises the complex of input data and output data characterizing a preferred embodiment of the dynamics module 14 of the vehicle.

Direct Input Data
  Steering angle δ [°]
  Longitudinal acceleration Ẍ [m/s²]
  Transverse acceleration ÿ [m/s²]
  Yaw rate r [°/s] or [rad/s]
Indirect Input Data
  none
Required Parameters
  Vehicle mass m [kg]
  Mass moment of inertia of the vehicle (polar moment of inertia) $I_z$ [kg·m²]
  Position of the vehicle centre of mass (defined by $l_f$ and $l_r$—front wheelbase and rear wheelbase—and $h_g$—height of the centre of mass from ground)
  Coefficient of longitudinal aerodynamic drag $C_x$ [–]
  Coefficient of vertical aerodynamic drag $C_z$ [–](generally very small; it may generally influence the calculation of the vertical forces acting on the motor vehicle, and ultimately it may influence the vertical load acting on the wheels)
Output Data
  Lateral grip [N]
  Longitudinal grip [N]
  Drift angle [°]
  Slip The calculation of mass variations due to the use of the vehicle is performed by analysing, in normal grip conditions, the torque data for the wheels and the vehicle acceleration. As regards the polar moment around axis z, it is possible to refer to the provided value without the need of updating it during the drive, because of the low sensitivity to the variation thereof. Optionally, it is possible to update the value of the polar moment of inertia around axis z on the basis of the vehicle mass, which is substantially the only component, among those included in the calculation of the moment of inertia, which may undergo variations during the drive. Specifically, the increase or the decrease of the mass generate, in an equiverse fashion, the increase or the decrease of the polar moment of inertia. In this regard, the same considerations apply as previously observed concerning updating the value of the vehicle mass: it may be updated by detecting accelerations during certain reference manoeuvres (e.g. low-speed manoeuvres) and it may be updated on the basis of the general dynamic balance of the vehicle, wherein fixed and known parameters (e.g. the front and rear wheelbase) and values available on the inertial platform are taken into account.

As regards the lateral dynamics of the vehicle, the preferred theoretical assumption corresponds to the "bicycle-shaped" model shown in FIG. 7A (obviously, other calculation models are possible, so this bicycle-shaped model must be regarded as an example). The theoretical reference for the calculation of the longitudinal dynamics of the vehicle in module 14 is shown in FIG. 7B.

In the preferred embodiments, module 14 operates on the basis of data acquired from an inertial platform of the vehicle, which indicates the acceleration components along axis x (ẍ, longitudinal axis), along axis y (ÿ, transverse axis) and the rotational acceleration $\dot{\omega}_z$ (or ṙ, as it corresponds to the time derivative of the yaw rate/yaw speed $\omega_z$—also denoted as r):

Knowing the mass (m), the wheelbases of the centre of mass ($l_f$ and $l_r$—front wheelbase and rear wheelbase) and the polar moment of inertia of the vehicle $I_z$ (net of the previously mentioned approximations due to use), from a simple balance at lateral translation and at rotation, by decomposing the forces on the single wheels along x and y, and by estimating the distribution of the longitudinal forces Fx between the front and rear axles as a function of the vertical forces in acceleration or braking (load transfer), it is possible to determine the following forces with reference to the "bicycle-shaped" model in FIG. 7A:
  Fxf: longitudinal force on front axle
  Fxr: longitudinal force on rear axle
  Fyf: transverse force on front axle
  Fyr: transverse force on rear axle.

It is moreover possible to determine the distribution of the aforementioned forces between the right side and the left side (i.e. on the single wheels) by knowing the data of the load transfer due to roll, which again are available from the inertial platform.

By knowing the vertical forces Fz (due to mass, aerodynamic load and longitudinal load transfers due to pitch, which again are known from the inertial platform and which depend, i.a., on the values Iy, i.e., the polar moment of inertia around axis y, and $\omega_y$, i.e., the pitch speed, see FIG. 7B), it is possible to determine the vertical forces Fzf and Fsr acting on the front axle and on the rear axle, and ultimately the friction coefficients μ on the single wheels of the vehicle.

From the analysis of the difference between the friction coefficients of the front axle and of the rear axle it is possible to infer the possible presence of aquaplaning conditions, because this phenomenon essentially concerns the front wheels (in other situations of low grip, such as driving on icy ground, the front and rear friction coefficients should be similar or identical).

The determination of forces Fxf, Fxr, Fyf, Fyr derives specifically from the complex of dynamic balance equations, which are well known, as follows:
(General Longitudinal and Transverse Balance)
  Fx=mẍ
  Fy=mÿ
(Balance at Transverse Translation)

$$m\ddot{y} = Fyf + Fyr$$

(Balance at rotation, Bicycle-Shaped Model)

$$I_z \dot{r} = Fyf \cdot l_f + Fyr \cdot l_r$$

(Balance at Translation Along Axis X)

$$Fxf + Fxr = Fx$$

with Fxf, Fxr=function of (Fzf, Fzr)

By dividing the lateral grip forces Fyf, Fyr by the vertical forces acting on the axles (which depend on the weight distribution of the vehicle) it is possible to estimate the transverse grip coefficients for each axle and each direction μfx=Fxf/Fzf (longitudinal grip coefficient on front axle)
μfy=Fyf/Fzf (transverse grip coefficient on front axle)
μrx=Fxr/Fzr (longitudinal grip coefficient on rear axle)
μry=Fyr/Fzr (transverse grip coefficient on rear axle).

In the presence of a steering angle δ, the grip coefficients on the front axle are calculating by decomposing the forces Fyf and Fxf along the steering direction, i.e. by recalculating the longitudinal Fxf (δ) and transverse Fyf (δ) components with reference to the middle plane of the steered wheel, thus obtaining $$Fyf(\delta) = Fyf \cdot sen(\delta) + Fxf \cdot \cos(\delta)$$

$$Fxf(\delta) = Fxf \cdot \cos(\delta) - Fyf \cdot sen(\delta)$$

As already stated with reference to module 12, some simplifying assumptions are made in the calculation, because various parameters involved in the dynamic balance equation which may be written by referring to the diagram of the FIGS. 7A, 7B may vary during the drive. For example, the position of the centre of mass may vary during the drive, and generally speaking it would be required to cyclically update the values of the parameters influencing the dynamic balance of the vehicle, but the method according to the invention enables solving this computational problem—as stated in the foregoing—by providing output data in through different a discrete configuration, magnitude levels of the output data. Through this differentiation, for instance, it is not necessary to know the exact position of the centre of mass of the vehicle in time, nor the vehicle mass.

Of course, if the computational burden does not pose problems and if it is possible to determine the output data continuously, it will be necessary to update the parameters of the vehicle which may vary during the drive according to one or more models available in the literature and currently used in the electronic control of the vehicle dynamics.

It is possible to set a dynamic balance evaluation in order to define the average value of the force discharged to ground by each of the tires, obviously mediated by the weight distribution along the vehicle and only depending on the input values from the inertial platform.

Once the grip coefficients on each tire have been determined, they are analysed according to the diagrams shown in FIG. 8A and in FIG. 8B. In the case of FIG. 8A, the calculation corresponds to an analysis of the absolute values of the grip coefficients on the four wheels. In the case of FIG. 8B, the calculation corresponds to a differential analysis between the grip of the front axle and of the rear axle. This simultaneously enables a first analysis of the ground a longitudinal grip conditions. For example, if coefficient is detected amounting to 1.1, it is reasonable to exclude the presence of icy ground. However, if the vehicle must deal with an aquaplaning event, the calculation of the longitudinal grip coefficients provides values which may cause confusing this condition with the drive on icy ground. In this regard, the quantitative analysis schematically shown in FIG. 8A is combined with the logical analysis shown in FIG. 8B. The purpose of such analysis is to determine the differences in the longitudinal grip coefficient between the front axle and the rear axle. The theoretical assumption derives directly from the physics of the aquaplaning phenomenon: essentially, it impacts on the front axle of the vehicle, while the rear axle is only marginally involved, because almost all the water film is swept away by the passage of the front axle. On the basis of such a consideration, it becomes possible to discriminate the various ground types one from the other and therefore to discriminate the drive on one of such ground types as opposed to an aquaplaning condition.

Module 16 (or "wheel module") has the function of repeating the evaluation of the grip coefficients of the driving wheels with the same purpose of module 14 (i.e., discriminating various grounds on the basis of the grip coefficient), but it executes the calculation with other parameters available on the data network (CAN or others) of the vehicle, in order to increase the level of reliability in critical conditions.

Referring to FIGS. 9 and 9A, the wheel module 16 again makes use, as input data complex, of the information on the CAN network (or another network of the vehicle), exactly in the same way as module 12 and module 14.

Module 16 executes five main operations, i.e.:
acquiring data from the CAN network (or from another network of the vehicle),
processing the slip of each wheel,
calculating the dynamic balance of each driving wheel and of the longitudinal friction/grip coefficient,
analysing the control loss,
defining the ground condition.

Module 16 is therefore configured to process the data on the CAN network (or another network on the vehicle) in such a way as to obtain:
an indication based on the slip, which defines a condition of grip loss potentially caused by a ground having a low grip coefficient, so as to provide the other modules 12, 14 with the indication of the reasons of the control loss;
an indication about the forces acting on the dynamic balance for each single wheel: calculation of the grip/friction coefficient on the basis of the power train.

By way of summary and partial anticipation of the subsequent discussion, the following list summarises the complex of input and output data characterizing a preferred embodiment of the wheel module 16.

Direct Input Data
Complex 1
  speed of the wheels (front left, front right, rear left, rear right) [rpm] or [rad/s]
  speed of advancement of the vehicle [m/s]
Complex 2
  gear engaged [–]
  speed of the wheels (front left, front right, rear left, rear right) [rpm] or [rad/s]
  drive torque [Nm]
  braking torque [Nm]
Complex 3
  longitudinal acceleration [m/s$^2$]
  transverse acceleration [m/s$^2$]
Indirect Input Data
  none
Required Parameters
  rolling radius of the wheel [m] or [mm];
  transmission ratio T_ratio between engine and wheels (for front drive or rear drive vehicles) or transmission ratio between engine and wheels mediated by the torque distribution ratio between the front axle and the rear axle (for four-wheel drive vehicles);
  mass moment of inertia of the wheel $I_{zW}$ [kgm$^2$];
Output Data
  longitudinal grip [N];
  longitudinal slip [–].

The function of the wheel module 16 is to cooperate synergically with the dynamics module 14 of the vehicle in order to calculate the longitudinal dynamics of the vehicle, in such a way as to widen the interval of effectiveness of both and to integrate them with module 12 (which again essentially regards the longitudinal dynamics), thus widening the global interval of effectiveness of the method according to the invention.

For example, in a condition of strong braking action, it is not easy to model the behaviour of the vehicle brakes. Therefore, the calculation of the grip/friction coefficient based on the analysis of the power train assembly becomes inconsistent, while a calculation model is more efficient if it is based on the inertial platform of the vehicle, as implemented in module 14.

However, other conditions may be present wherein the model of dynamic balance of the wheel is the most consistent and accurate, because the force distribution on the various wheels is not estimated, but on the contrary it is directly calculated.

Figure 9B:
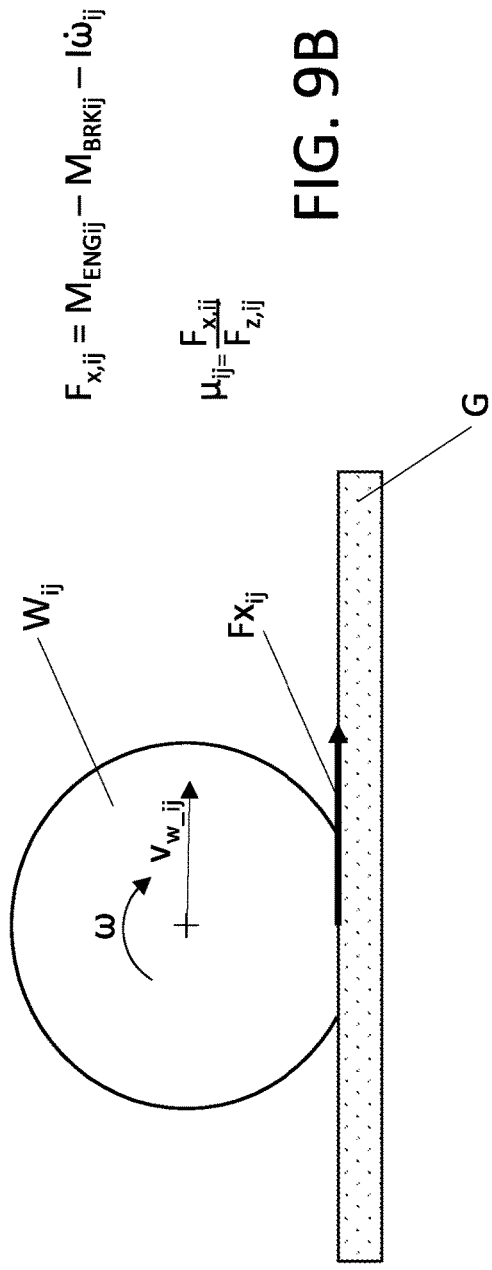
FIGS. 9 and 10 show block diagrams concerning the preferred implementation of third elements of the method according to the invention.
Figure 9C:
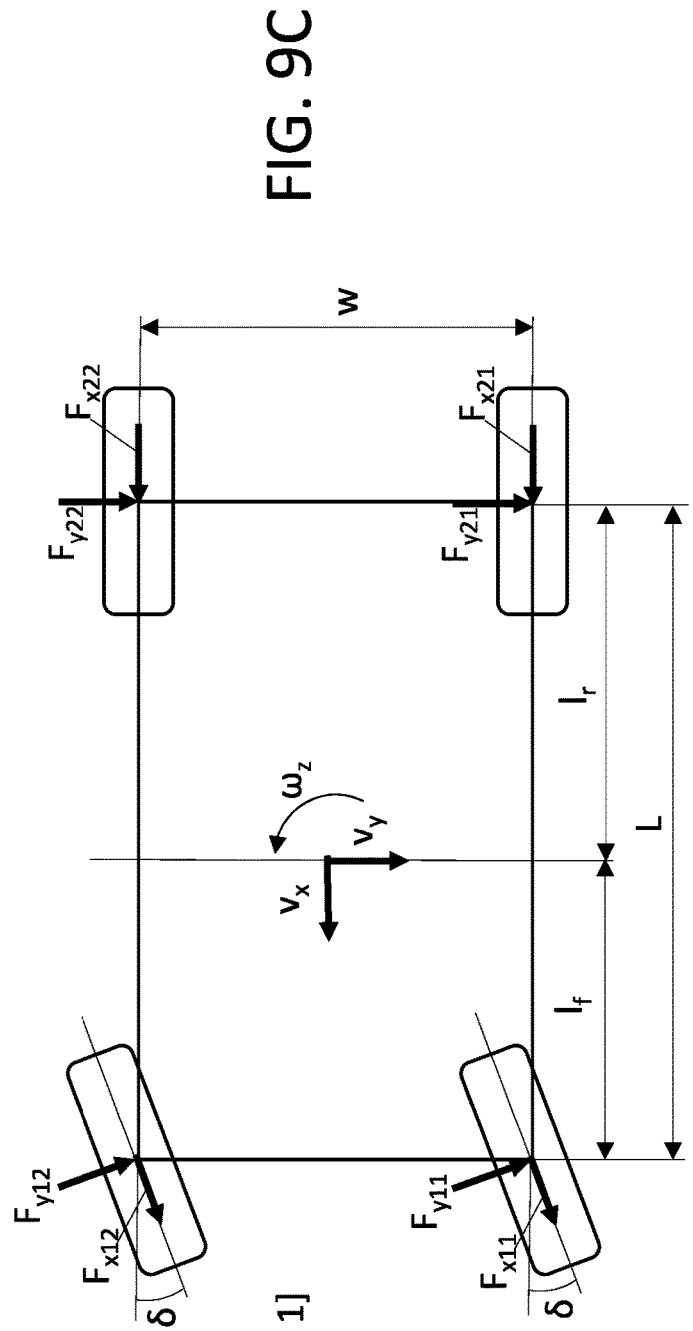

With reference to FIG. 9C, the slip is calculated on the basis of the input data of complex 1 and according to models known in the literature $$\text{Slip}_{ij}(S_{ij}) = [(\omega_{ij} \cdot R_{ij})/v_{ij} - 1]$$

wherein:
$\omega_{ij}$=rotational speed of the right/left wheel (i) of the front/rear axle (j)
$R_{ij}$=rolling radius of the right/left wheel (i) of the front/rear axle (j)
$v_{w\_ij}$=longitudinal speed of the right/left wheel (i) of the front/rear axle (j), which equals the sum of the longitudinal speed v of the vehicle with the product of the yaw rate r, multiplied by the radius of curvature $D_{ij}$ of the trajectory at the right/left wheel (i) of the front/rear axle (j).

FIG. 9B shows the longitudinal dynamic balance model of the tire, which is involved in the computational process of the wheel module 16 on the basis of the values of module 12. As regards FIG. 9C, it strictly refers to module 16 for the parameters describing the longitudinal dynamics of the vehicle. The parameters describing the transverse dynamics essentially regard module 14, such as, e.g., the values Fy_ij, which may be derived from the transverse grip values Fyf and Fyr.

More specifically, the data on the CAN network (or another network) of the vehicle (complex 2) are used for determining the value of the longitudinal force discharged to the ground by each single wheel.

The dynamic balance equation is very simple and it is as follows:

$$F_{x\_ij} = M_{eng\_ij} - M_{brk\_ij} - I_{w\_ij}\omega_{ij}'$$

wherein:
$F_{x\_ij}$ is the longitudinal force discharged to the ground by the right/left wheel (i) of the front/rear axle (j)
$M_{eng\_ij}$ is the drive torque acting on the right/left wheel (i) of the front/rear axle (j)
$M_{brk\_ij}$ is the braking torque acting on the right/left wheel (i) of the front/rear axle (j) is the mass moment of inertia of the right/left wheel (i) of the front/rear axle (j)
$\omega_{ij}'$ is the angular acceleration value of the right/left wheel (i) of the front/rear axle (j).

It is thus possible to obtain the value of the friction/grip coefficient $\mu_{x\_ij}$ for each wheel, defined as the ratio $F_{x\_ij}/F_{z\_ij}$, wherein $F_{z\_ij}$ is the vertical load acting on the right/left wheel (i) of the front/rear axle (j), which is known from the values of complex 3, enabling to estimate the value of the longitudinal load transfer and of the transverse load transfer.

Figure 10:
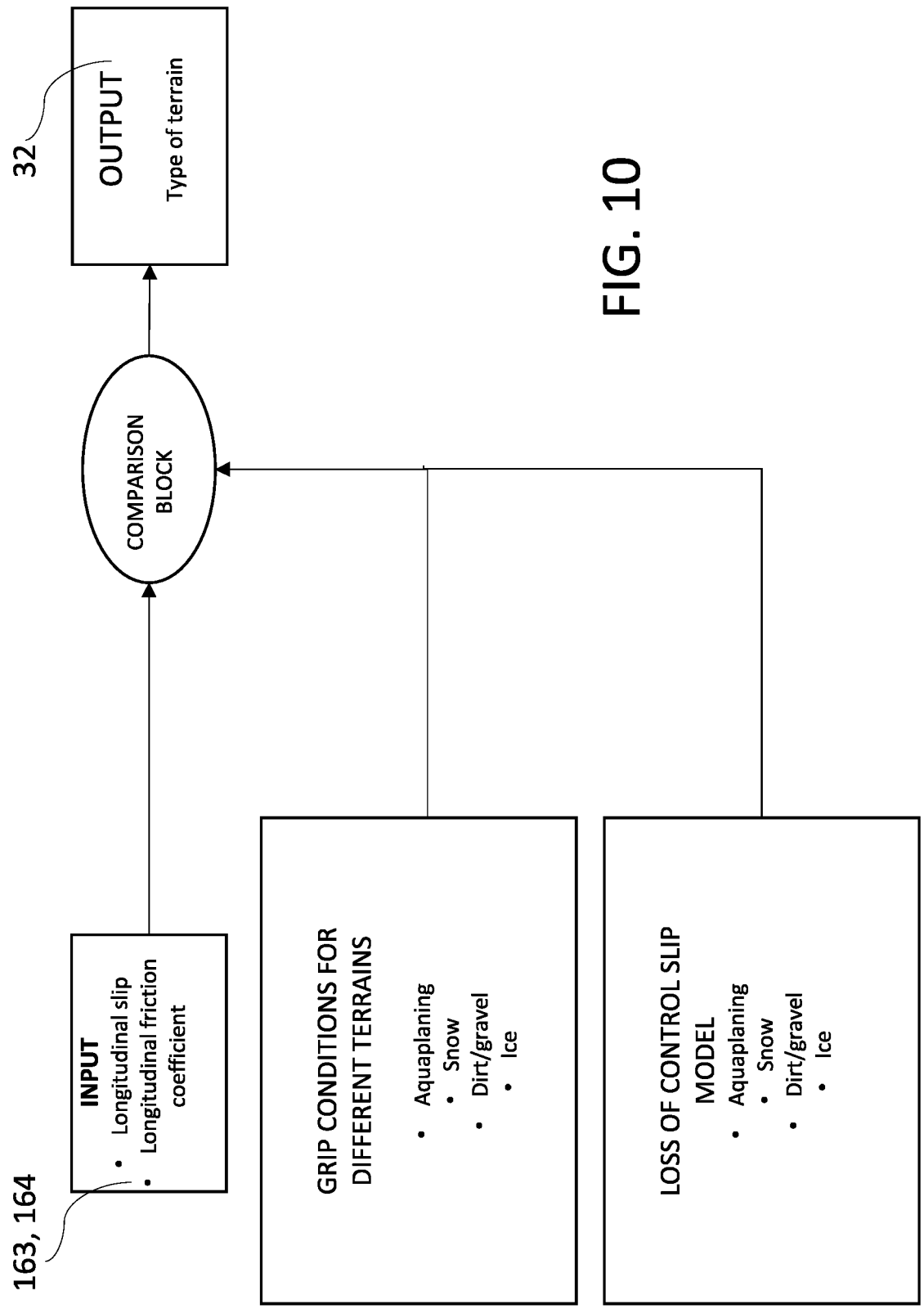
Figure 11:
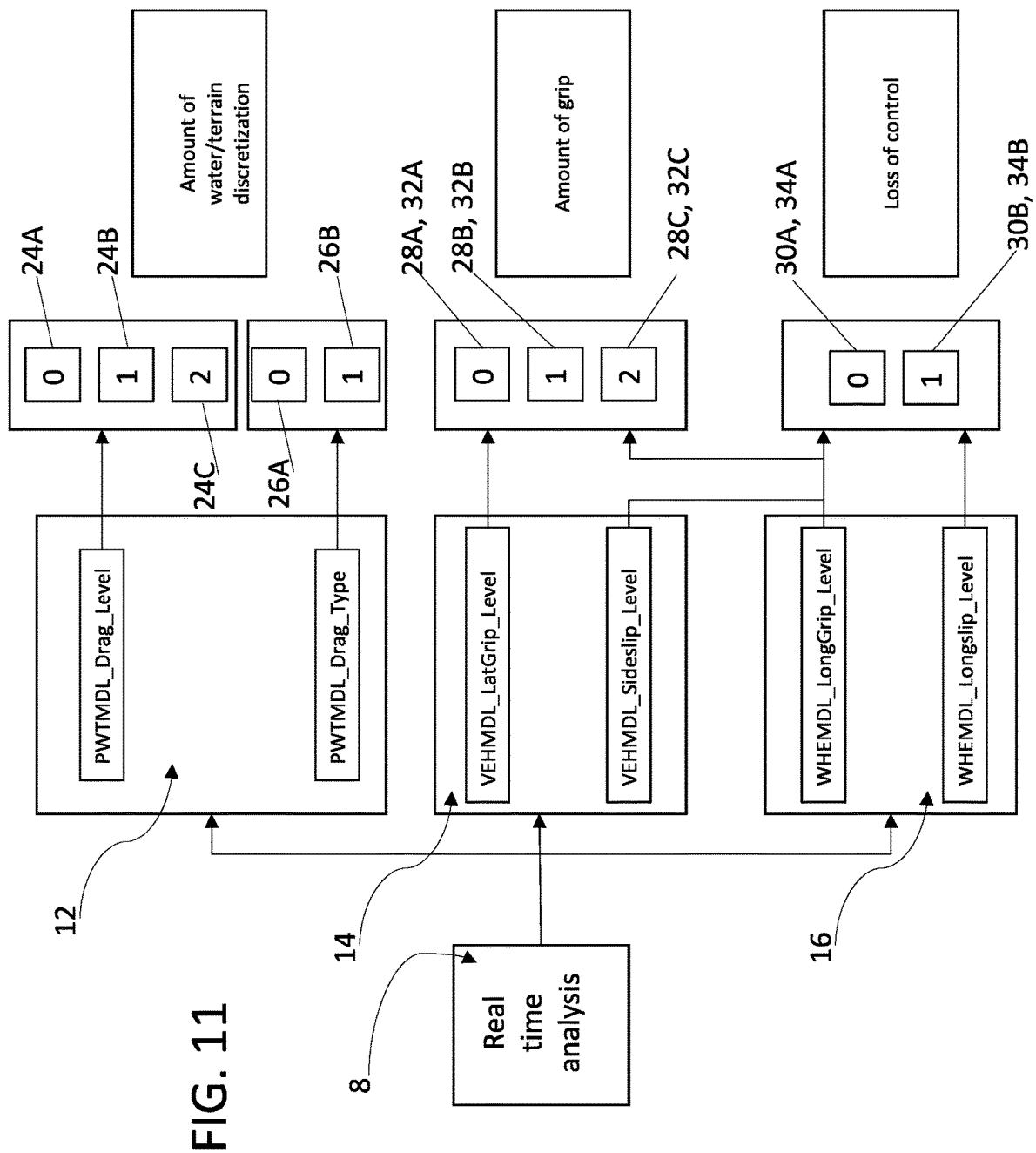
FIGS. 11 to 15 show logic diagrams associated with each output of the method according to the invention.

The output data of the balance equation of the wheel dynamics ($F_{x\_ij}$, $\mu_{x\_ij}$) and of the wheel slip ($S_{ij}$) are used as input data for the following analysis, as shown in FIG. 10.

It is therefore possible:
to define the ground type the vehicle is driving on. With the typical performances of the sensors on board, it is possible to divide the ground types into high/medium/low grip/friction. Moreover, it is possible to detect irregular grounds (such as dirt/gravel) thanks to the variation frequencies of the slip.

As regards the dynamic balance of the vehicle, it is possible to extract a complex of output data similar to what is obtained in module 14 for the longitudinal dynamics of the vehicle. As already described in the foregoing, providing similar complexes of output data from different calculation modules may improve the reliability of the system and may widen the interval of effectiveness thereof. Moreover, the wheel module 16 operates on the longitudinal components of the wheels, while module 14 is configured to process the forces which are discharged to ground both laterally and longitudinally.

a whole, the combined computational As implementation of modules 12, 14, 16 leads to providing three complexes of output data (see again FIG. 1, complex 10):
i) Ground type
ii) Grip condition
iii) Information of proximity to an aquaplaning condition.

Among the data complexes i)-iii), the data complexes i) and iii) are discrete complexes, while complex ii) may be continuous (with real-time updating of the vehicle parameters which vary during the drive) or discrete. In order to be able to combine the results of the three calculation modules 12, 14, 16, a logical simplification is preferably carried out which reduces each complex i)-iii) to a discrete complex.

Referring to FIG. 10, the following simplifications are carried out:

Output Data Complex of Module 12

PWTMDL_Drag_Level (block 24): it corresponds to the value of additional drag FD determined by the method according to the invention, and it is classified into three levels (all referring to each single instant)
Level 0 (block 24A): no component of additional drag is detected, and therefore the vehicle has no possibility of encountering an aquaplaning event
Level 1 (block 24B): a substantial component of additional drag is detected, and therefore the vehicle is no longer in the reference state and there is a concrete of possibility occurrence of an aquaplaning condition
Level 2 (block 24C): a component of additional drag is detected which is higher than the component that gives rise to a lift value sufficient for lifting the tire from ground. An aquaplaning event is certain.

PWTMDL_Drag_Type (block 26): the value of additional drag $F_D$ determined by means of the method according to the invention is also used for a first estimate of the ground type that the vehicle is driving on. Two-level classification:
Level 0 (block 26A): the additional drag value is constant with respect to the vehicle speed. This indicates loose grounds (dirt, gravel) or dry tarmac Level 1 (block 26B): the additional drag value increases with the speed of the vehicle. It is a possible indication of an aquaplaning event.

Complex of Output Data of Modules 14 and 16

VEHMDL_LatGrip_Level (block 144, block 28—module 14, transverse grip), WHEMDL_LongGrip_Level (block 144, block 28—module 14, longitudinal grip; block 162, block 32—module 16, longitudinal grip): The values of longitudinal grip force and transverse grip force calculated by modules 14 and 16, which correspond to the grip force values Fxf, Fxr, Fyf, Fyr and—with respect to the single wheels—to the values Fx,ij shown in FIGS. 9B and 9C, wherein i=1 (front), 2 (rear), j=1 (left), 2 (right), are combined into a resultant and are classified into three levels:

Level 0 (blocks 28A, 32A): a high level of grip is detected. The vehicle is driving on a road where it is possible to exchange a high amount of force with the ground.

Level 1 (blocks 28B, 32B): a decrease in grip is detected. This condition may include various grounds (dirt/gravel/snow).

Level 2 (blocks 28C, 32C): grip approaches zero. The vehicle may be undergoing aquaplaning or may be travelling on ice.

Moreover, the description in the foregoing makes it clear that the vehicle dynamics module 14 calculates the longitudinal grip values, i.e., it is adapted to calculate the longitudinal grip level (LongGrip_Level) as well. Therefore, the calculation of transverse grip is performed by module 14, while the calculation of the longitudinal grip is performed by both modules 14 and 16. On the basis of the reliability of both output signals from each module (which depend on the different driving conditions) it is possible to choose which reading to rely on. Only after the reliability check may the values be combined.

VEHMDL_SideSlip_Level (block 145, block 30 module 14, drift), WHEMDL_Slip_Level (block 164, block 34—module 16, slip): the drift conditions or indications (side slip of the tires/drift angle of the vehicle) and the longitudinal slip conditions of the tires calculated by modules 14 and 16 are classified into two levels:

level 0: no slip and/or drift: the vehicle is under control (block 30A, block 34A)

level 1: slip and/or drift: the vehicle is losing control (block 30B, block 34B).

Referring to FIGS. 12 to 15, there will now be described the proximity to an aquaplaning condition and the ground type by means of the method according to the invention.

Figure 12:
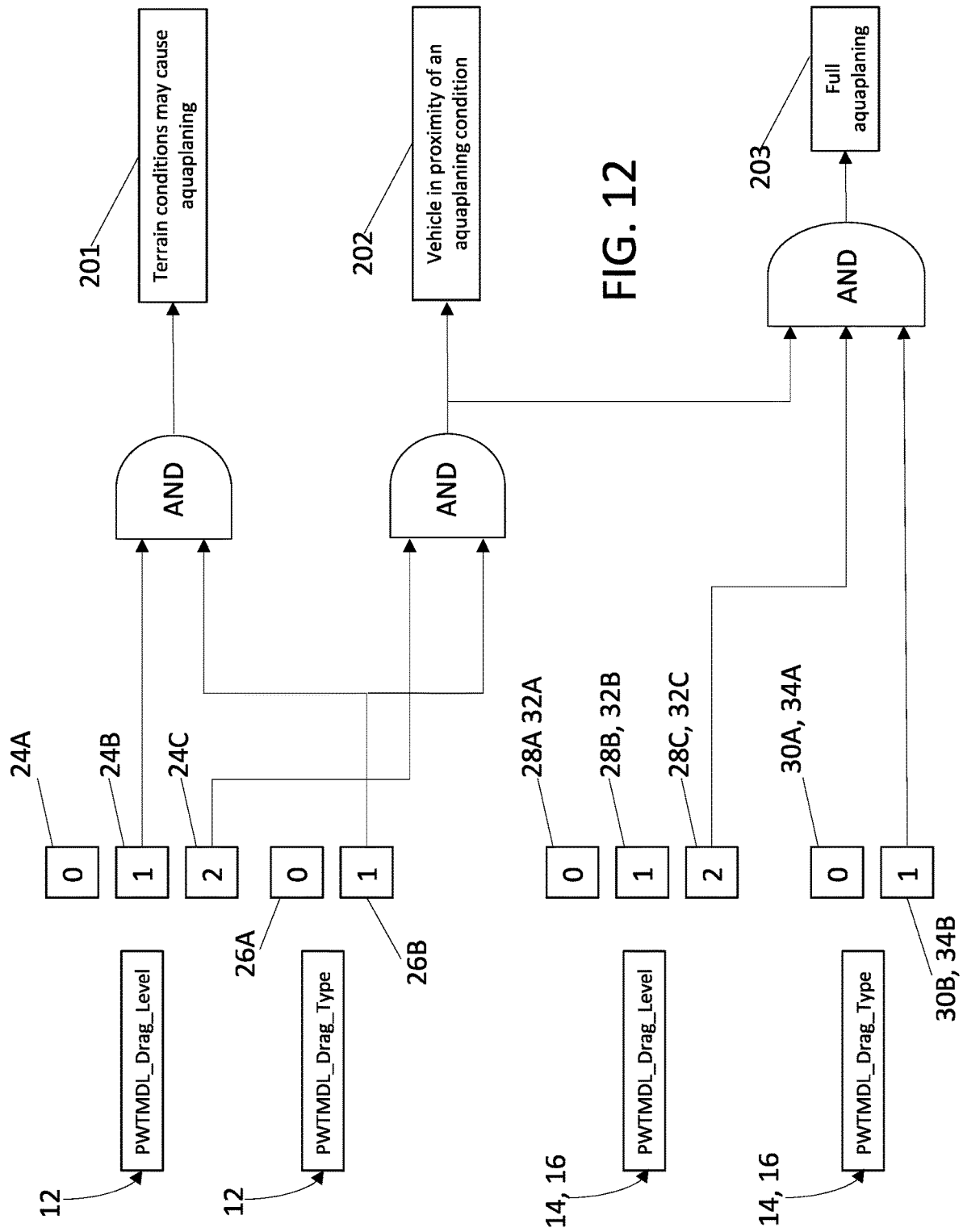

Proximity to an Aquaplaning Condition (FIG. 12)

The starting point is the power train module 12. On the basis of the output data therefrom a twofold check is carried out:

a) whether an additional drag component is present. If it is, the second check is carried out b) whether the additional drag component varies with speed. If it does, there is a possibility of aquaplaning, if it does not there is no possibility of aquaplaning, and therefore the process ends with a corresponding indication. If the vehicle is equipped with an aquaplaning system, the latter is kept in standby conditions.

If checks a) and b) give a positive result, it is possible to pre-warn the vehicle driver about the possibility of aquaplaning, and it is moreover possible to bring the aquaplaning system (if present) to pre-trigger or pre-alert conditions. In such a situation, the vehicle may not have reached the aquaplaning conditions simply because the speed of advancement thereof is not sufficiently high, and therefore the additional drag generated is not enough to bring about a lift causing the tires to detach from the ground. The logic output corresponds to block 201 (possibility of aquaplaning) or 202 (proximity to aquaplaning), if the additional drag component is equal to or higher than a value which would give rise to a lift sufficient to exceed the threshold force value, causing the tires to detach from the ground.

In the preferred embodiments, wherein all calculation modules 12, 14, 16 are present, it is possible to execute further checks, therefore increasing the reliability of the conclusions thanks to modules 14, 16.

First of all, it is possible to detect the grip level. To the purpose, it is possible to calculate the transverse and longitudinal grip level by means of module 14 (VEHMDL_LatGrip_Level and VEHMDL_LongGrip_Level values, block 144, block 28), and the longitudinal grip by means block 16 of (WHEMDL_LongGrip_Level value, block 162, block 32), and it is possible to calculate the vehicle drift by means of module 14 (VEHMDL_SideSlip_Level value, block 145, block 30), and the side slip by means of module 16 (WHEMDL_Slip_Level, block 164, block 34). The are conditions of certainty of aquaplaning (block 203) reached only if the complex of grip data VEHMDL_LatGrip_Level and WHEMDL_LongGrip_Level is at level 2 and the complex of slip data VEHMDL_SideSlip_Level and WHEMDL_Slip_Level is at level 1. In this situation, the vehicle driver is warned, and the aquaplaning system on board the vehicle is activated according to fashions which may depend on the instantaneous values of slip, grip and drift, i.e. by varying the power and the liquid flow rate thereof as a function of such parameters.

Figure 13:
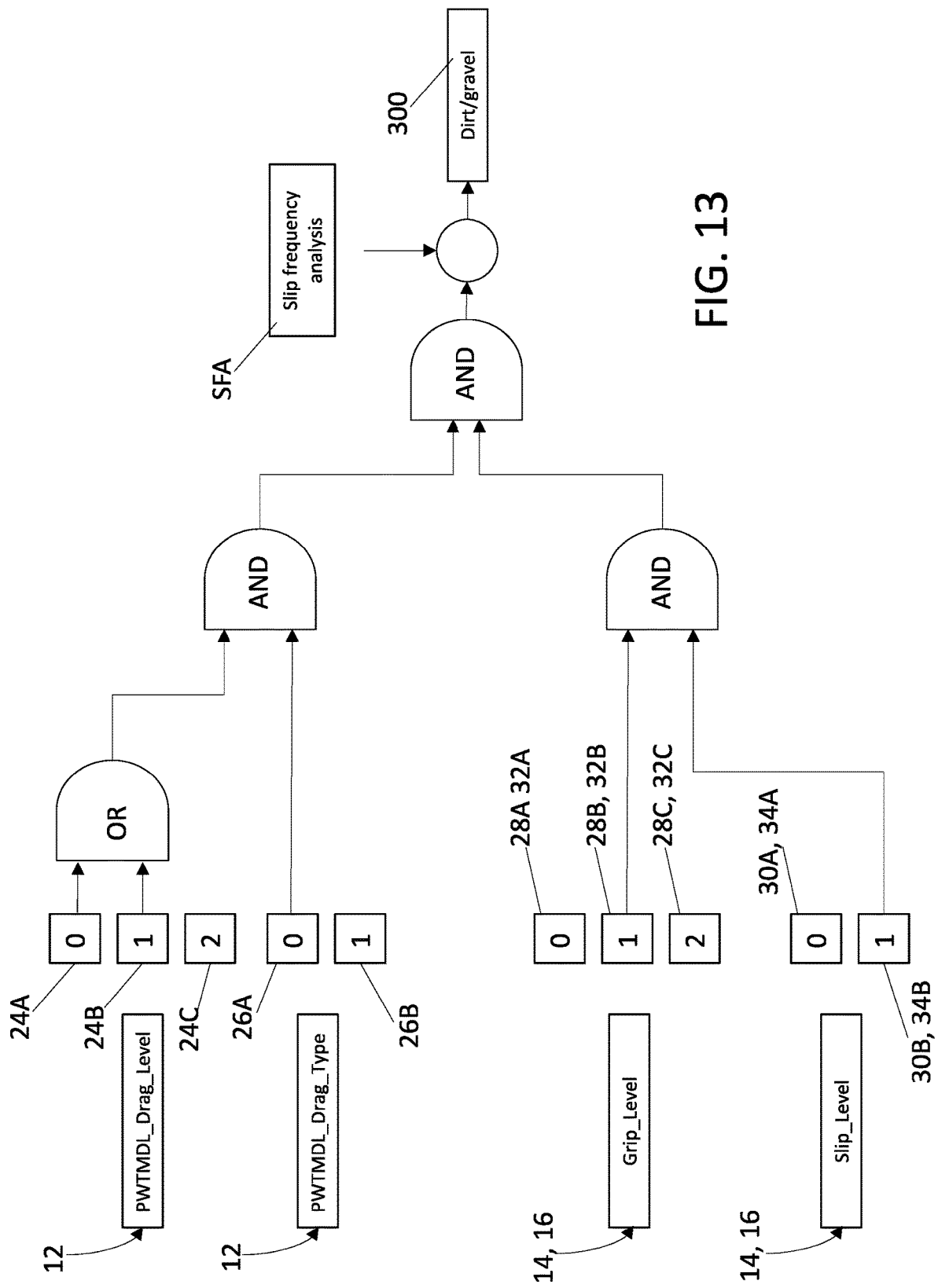
Figure 14:
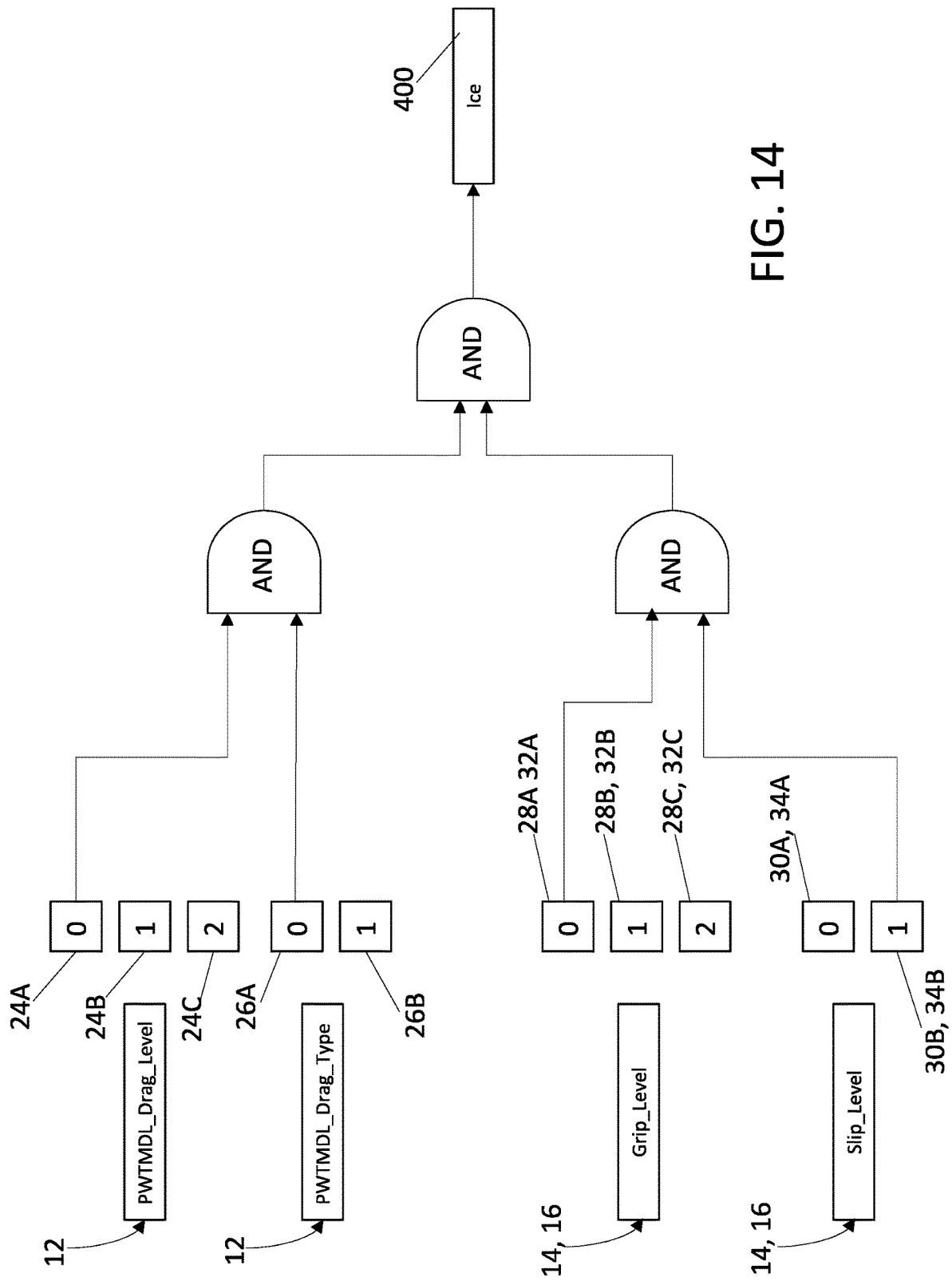

Detection of Conditions of Loose Ground (Dirt/Gravel) or Ice—FIGS. 13 and 14

When it is attempted to determine other low-grip conditions, such as dirt/gravel or ice, the detecting process is different from the process for determining the proximity to an aquaplaning condition.

The starting point is again the power train module 12, specifically the type of additional drag. Both in the case of dirt/gravel and in the case of ice, the additional drag is not caused by a viscous component, and therefore it should be constant at different speeds (PWTMDL_Drag_Type is at level 0). The evolution in time of the additional drag may be investigated over a relatively short time window, in order to understand if the value thereof actually does not change with the vehicle speed.

In this context, the key parameters are therefore the slips (longitudinal slip and drift), i.e., what describes the situation of vehicle control. If the complex of the slip data VEHMDL_ SideSlip_Level and WHEMDL_Slip_Level is at level 1, it may be inferred that the vehicle is losing grip at a level which is not yet being corrected by control system (e.g., ESC). It is therefore possible to investigate about the ground conditions which affect controllability, and to warn the driver correspondingly.

With reference to module 12, an icy ground (FIG. 13) may be considered as a road having little resistance to advancement. Therefore, the additional drag calculated by means of module 12 should be comprised in level 0. A loose ground, such as dirt or gravel, may change the additional drag from level 0 to level 1. In other words, in many cases it equals 1, but in a few cases the grip level is so low as to reach level 0. The slip frequency analysis SFA may be useful for ultimately discriminating loose grounds (block 300, FIG. 13) from ice (block 400, FIG. 14), in the latter case PWTMDL Drag Level being certainly at level 0. The anti-aquaplaning system is not activated (it is left in stand-by conditions) and the driver is warned by the conventional warning light associated with the drive and stability control of the vehicle. The vehicle control units as well may be provided with useful information to regulate torque delivery, braking or suspension rigidity, so as to make driving safer and more comfortable.

Figure 15:
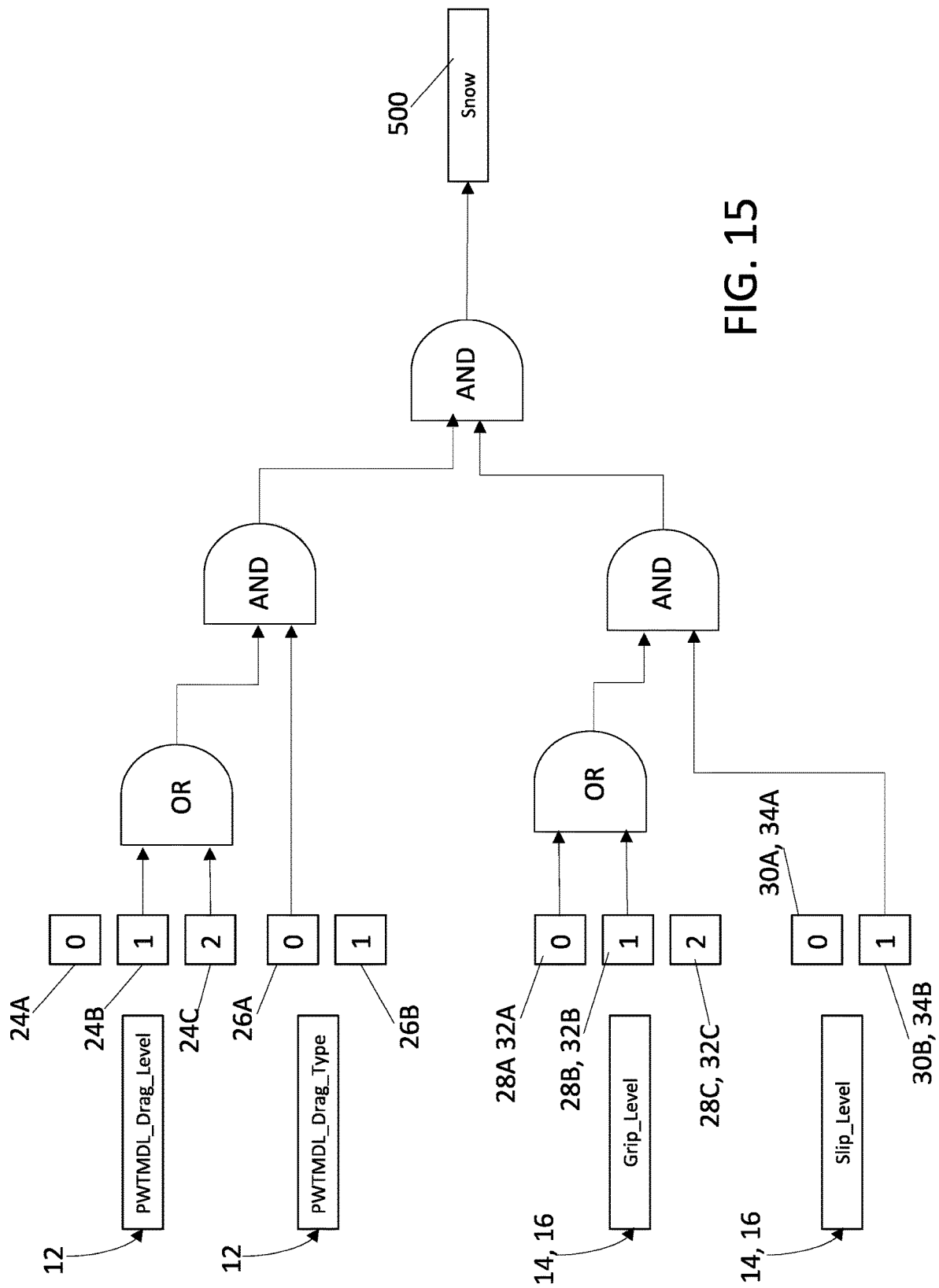

Detection of Snowy Ground Conditions—FIG. 15

On snowy ground, the deduction logic is a sort of compromise between the logic for determining the proximity to aquaplaning conditions and the logic adopted for discriminating low-grip grounds, such as dirt/gravel or ice.

Snow generally creates a rather high additional drag, and therefore PWTMDL_Drag_Level will certainly be at level or 1 level 2. On the other hand, PWTMDL_Drag_Type will certainly be at level 0, because the amount of additional drag is not of the viscous type and does not vary with speed. As far as the complex of grip values VEHMDL_LatGrip_Level and WHEMDL_LongGrip_Level is concerned, they may be at level 0 or at level 1, but certainly not at level 2 (which is the typical level of aquaplaning). The detection of snowy ground (block 500) is optionally completed by a grip loss: in this case the complex of slip values VEHMDL_SideSlip_Level and WHEMDL_Slip_Level goes to level 1. The anti-aquaplaning system is not activated (it is left in stand-by conditions) and the driver is warned via the conventional warning light associated with the drive and stability controls of the vehicle.

As it was amply discussed and demonstrated, thanks to the invention it is possible to discriminate not only the proximity to an aquaplaning condition, but also the type of ground the vehicle is travelling on, with the help of a synergy among modules 12, 14, 16 which enables the selecting most reliable and consistent data as a function of the condition. Moreover, this does not require any kind of further sensor equipment, and creates a perfect integration with the vehicle and with the anti-aquaplaning systems on board the latter.

Of course, the implementation details and the embodiments may amply vary with respect to what has been described and illustrated herein without departing from the scope of the present invention, as defined in the annexed claims.

The invention claimed is:

1. A method for determining interface conditions between tire and ground in a motor vehicle to determine an onset of aquaplaning phenomena, comprising:
   determining a reference longitudinal acceleration ($a_{XPTMDL}$) of the vehicle,
   measuring an actual longitudinal acceleration of the vehicle ($a_{XCAN}$),
   calculating a difference between said reference longitudinal acceleration and said actual longitudinal acceleration,
   determining an additional drag ($F_D$, PWTMDL_Drag_Level) at an interface between the tire and the ground on a basis of said difference, and a lift ($F_L$) at the interface between the tire and the ground on a basis of said additional drag ($F_D$),
   determining a threshold force at which lifting of the tire from the ground occurs, and
   comparing said lift with said threshold force and determining a degree of proximity of the interface conditions between the tire and the ground to an aquaplaning condition.

2. The method according to claim 1, wherein determining said additional drag ($F_D$, PWTMDL_Drag_Level) comprises:
   classifying said additional drag ($F_D$, PWTMDL_Drag_Level) into a plurality of progressive levels (24A, 24B, 24C) on a basis of a value thereof, wherein the progressive levels of said plurality of progressive levels correspond to increasing values of said additional drag, and
   determining an existence of a dependency of said additional drag on a speed of advancement of the vehicle (PWTMDL_Drag_Type).

3. The method according to claim 2, comprising:
   signaling a condition of traveling on loose or low-grip ground if the value of said additional drag (PWTMDL_Drag_Level) is lower than a value that gives rise to the lift that is equal to or greater than said threshold force and no dependency of said additional drag from the speed of advancement of the vehicle exists,
   signaling a condition of possibility of the aquaplaning phenomenon if a dependency exists of said additional drag from the speed of advancement of the vehicle and if the value of said additional drag (PWTMDL_Drag_Level) is lower than a value that gives rise to the lift that is equal to or greater than said threshold force, and
   signaling a condition of proximity to the aquaplaning phenomenon if the value of said additional drag (PWTMDL_Drag_Level) is equal to or greater than the value which gives rise to the lift that is equal to or greater than said threshold force and the dependency exists of said additional drag from the speed of advancement of the vehicle.

4. The method according to claim 2, further comprising:
   determining a longitudinal grip force of the vehicle,
   determine a transverse grip force of the vehicle, and
   classifying a complex of said longitudinal grip force and transverse grip force (WHEMDL_LongGrip_Level, VEHMDL_LatGrip_Level) into the plurality of progressive levels (24A, 24B, 24C) on a basis of a resultant thereof, wherein the progressive levels of said plurality of progressive levels correspond to decreasing values of said resultant.

5. The method of claim 4, further comprising:
   determining a vehicle side slip indicator (VEHMDL_SideSlip_Level), and
   determining a longitudinal slip (WHEMDL_Slip_Level) of the tires.

6. The method according to claim 5, comprising indicating a condition of occurrence of an aquaplaning phenomenon if:
   the value of said additional drag (PWTMDL_Drag_Level) is equal to or greater than a value that gives rise to the lift that is equal to or greater than said threshold force and the dependency of said additional drag from the speed of advancement of the vehicle exists,
   the complex of said longitudinal grip force and transverse grip force is classified at a last one (24C) of said progressive levels, and
   at least one of said vehicle side slip indicator and longitudinal slip has a non-zero value.

7. The method according to claim 5, further comprising indicating a condition of travelling on a loose ground, including dirt or gravel, if:
   the value of said additional drag (PWTMDL_Drag_Level) is lower than a value that gives rise to the lift equal to or greater than said threshold force and no dependency of said additional drag on the speed of advancement of the vehicle exists, the complex of said longitudinal grip force and transverse grip force is classified at an intermediate level (24B) of said progressive levels, and at least one of said vehicle side slip indicator and longitudinal slip has a non-zero value.

8. The method according to claim 5, further comprising signaling a condition of travelling on an icy ground if:

the value of said additional drag (PWTMDL_Drag_Level) is classified at the first (24A) of said progressive levels and no dependency of said additional drag on the speed of advancement of the vehicle exists, the complex of said longitudinal grip force and transverse grip force is classified at an intermediate level (24B) of said plurality of progressive levels, and at least one of said vehicle side slip indicator and longitudinal slip has a non-zero value.

9. The method according to claim 5, further comprising signaling a condition of travelling on a snow-covered ground if:

the value of said additional drag (PWTMDL_Drag_Level) is classified at an intermediate level (24B) of said plurality of progressive levels or at the last level (24C) of said plurality of progressive levels and there is no dependence of said additional drag on the speed of advancement of the vehicle, the complex of said longitudinal grip force and transverse grip force is classified at the first level (24A) or at the intermediate level (24B) of said plurality of progressive levels, and at least one of said vehicle side slip indicator and longitudinal slip has a non-zero value.

10. The method according to claim 6, further comprising activating an intervention of an anti-aquaplaning system on board the vehicle.

* * * * *